(12) United States Patent
Fukasawa et al.

(10) Patent No.: US 11,691,450 B2
(45) Date of Patent: Jul. 4, 2023

(54) PAPER SEPARATION MECHANISM OF STAPLELESS BINDER

(71) Applicant: HEWLETT-PACKARD DEVELOPMENT COMPANY, L.P., Spring, TX (US)

(72) Inventors: Eiji Fukasawa, Seongnam-si (KR); Taehong Kim, Seongnam-si (KR); Jeongyeon Park, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/791,732

(22) PCT Filed: Dec. 21, 2020

(86) PCT No.: PCT/US2020/066370
§ 371 (c)(1),
(2) Date: Jul. 8, 2022

(87) PCT Pub. No.: WO2021/146034
PCT Pub. Date: Jul. 22, 2021

(65) Prior Publication Data
US 2023/0085336 A1    Mar. 16, 2023

(30) Foreign Application Priority Data

Jan. 16, 2020  (KR) .................. 10-2020-0005913

(51) Int. Cl.
*B65H 37/04* (2006.01)
*B42C 1/12* (2006.01)
(Continued)

(52) U.S. Cl.
CPC ................. *B42C 1/125* (2013.01); *B41J 3/44* (2013.01); *B41J 11/0015* (2013.01); *B42B 4/00* (2013.01);
(Continued)

(58) Field of Classification Search
CPC ................ B31F 5/02; B31F 2201/0754; B31F 2201/0779; B31F 1/07; B42C 1/125;
(Continued)

(56) References Cited

U.S. PATENT DOCUMENTS 8,123,097 B2 *  2/2012  Haramiishi ............... B27F 7/17
                                                    227/100
8,540,228 B2 *  9/2013  Shiraishi ................... B42B 5/00
                                                    270/58.08
(Continued)

FOREIGN PATENT DOCUMENTS

JP  2004168435 A  *  6/2004
JP  2010274623 A  * 12/2010
(Continued)

*Primary Examiner* — Leslie A Nicholson, III
(74) *Attorney, Agent, or Firm* — Brooks, Cameron & Huebsch, PLLC

(57) ABSTRACT

A post-processing apparatus includes a paper alignment tray including a loading table on which a paper is to be loaded, and a side guide and an end guide to align a side in a width direction and an end in a longitudinal direction of the paper stack, respectively, a first binder including a binding unit to bind the paper stack on the paper alignment tray in a stapleless manner, the first binder displaceable to a binding location to bind the paper stack and to a separation location to separate the binding unit from the paper stack, and a controller to move the paper stack relative to the binding unit while displacing the first binder from the binding location to the separation location.

20 Claims, 15 Drawing Sheets

(51) Int. Cl.
- *B41J 3/44* (2006.01)
- *B41J 11/00* (2006.01)
- *B42B 4/00* (2006.01)
- *B42B 5/00* (2006.01)
- *B42C 19/08* (2006.01)
- *B65H 31/30* (2006.01)
- *B65H 31/38* (2006.01)

(52) U.S. Cl.
CPC ............... *B42B 5/00* (2013.01); *B42C 19/08* (2013.01); *B65H 31/3027* (2013.01); *B65H 31/3081* (2013.01); *B65H 31/38* (2013.01); *B65H 37/04* (2013.01); *B65H 2301/51611* (2013.01); *B65H 2301/51616* (2013.01); *B65H 2408/1222* (2013.01); *B65H 2701/1829* (2013.01); *B65H 2701/18292* (2013.01); *B65H 2801/27* (2013.01)

(58) Field of Classification Search
CPC ............ B65H 37/04; B65H 31/34; B65H 2408/1222; B65H 2301/51616; B65H 2301/43828; B65H 2801/27; B65H 2701/1829; B65H 2701/18292

See application file for complete search history.

(56) References Cited

U.S. PATENT DOCUMENTS

| | | | |
|---|---|---|---|
| 9,126,794 B2* | 9/2015 | Abe | B65H 31/34 |
| 9,346,647 B2 | 5/2016 | Obuchi et al. | |
| 9,415,560 B2* | 8/2016 | Morinaga | B31F 5/02 |
| 9,725,275 B2* | 8/2017 | Matsuki | B65H 9/101 |
| 10,087,034 B2* | 10/2018 | Awano | G03G 15/6544 |
| 10,097,711 B2* | 10/2018 | Suzuki | B31F 5/02 |
| 10,252,485 B2* | 4/2019 | Aoyagi | B42C 1/12 |
| 10,275,694 B2 | 4/2019 | Kimura | |
| 10,421,307 B2* | 9/2019 | Suzuki | B65H 37/04 |
| 10,472,198 B2* | 11/2019 | Komiyama | B65H 31/34 |
| 10,481,544 B2* | 11/2019 | Yoshida | H04N 1/00639 |
| 2015/0076759 A1 | 3/2015 | Kosuge et al. | |
| 2018/0072084 A1 | 3/2018 | Shimizu | |

FOREIGN PATENT DOCUMENTS

| | | |
|---|---|---|
| JP | 2016-199396 | 12/2016 |
| JP | 2017-7851 | 1/2017 |
| JP | 2017-19660 | 1/2017 |
| JP | 2017-119384 | 7/2017 |
| JP | 2018-43842 | 3/2018 |

* cited by examiner

PAPER SEPARATION MECHANISM OF STAPLELESS BINDER

CROSS REFERENCE TO RELATED APPLICATIONS

This application is a U.S. National Stage Application which claims the benefit under 35 U.S.C. § 371 of International Patent Application No. PCT/US2020/066370 filed on Dec. 21, 2020, which claims the priority benefit of Korean Patent Application No. 10-2020-0005913 filed on Jan. 16, 2020, the contents of each of which are incorporated herein by reference.

BACKGROUND

A post-processing apparatus is an apparatus that performs a post-processing operation on a medium, for example, a sheet of paper on a stack of paper. The post-processing apparatus may be a stand-alone apparatus. The post-processing apparatus may be connected to a printing apparatus to form an image forming apparatus. The post-processing apparatus may perform a post-processing process on a printing medium on which printing is completed by the printing apparatus as a subsequent process of a printing job performed by the printing apparatus.

The post-processing apparatus may include a staple binder to drive a staple into an edge or a corner of a paper stack in which several sheets of paper are aligned. The post-processing apparatus may include a stapleless binder that does not use a staple. The stapleless binder places a paper stack between a pair of pressure tooth shape portions facing each other in a vertical direction and binds the paper stack by pressing one corner thereof onto the pair of pressure tooth shape portions. The post-processing apparatus discharges the paper stack on which binding is completed to a tray. The post-processing apparatus may further include a folder to fold paper one or more times, a puncher to punch the paper, and so on.

DETAILED DESCRIPTION

Figure 1:
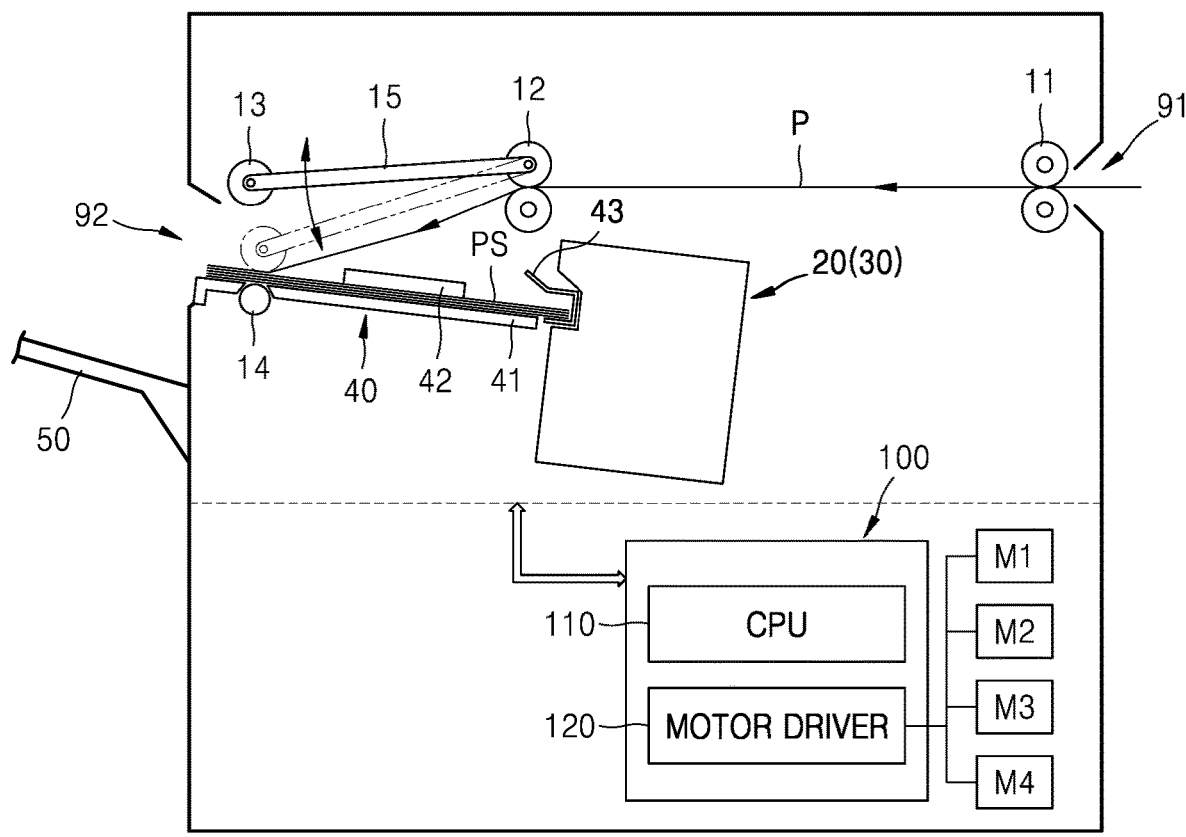
FIG. 1 is a schematic side configuration view of an example of a post-processing apparatus.

Hereinafter, examples of a post-processing apparatus will be described with reference to the drawings. Like reference numerals in the drawings refer to like configuration elements, and a size or a thickness of each configuration element may be exaggerated for the sake of clarity.

Figure 2:
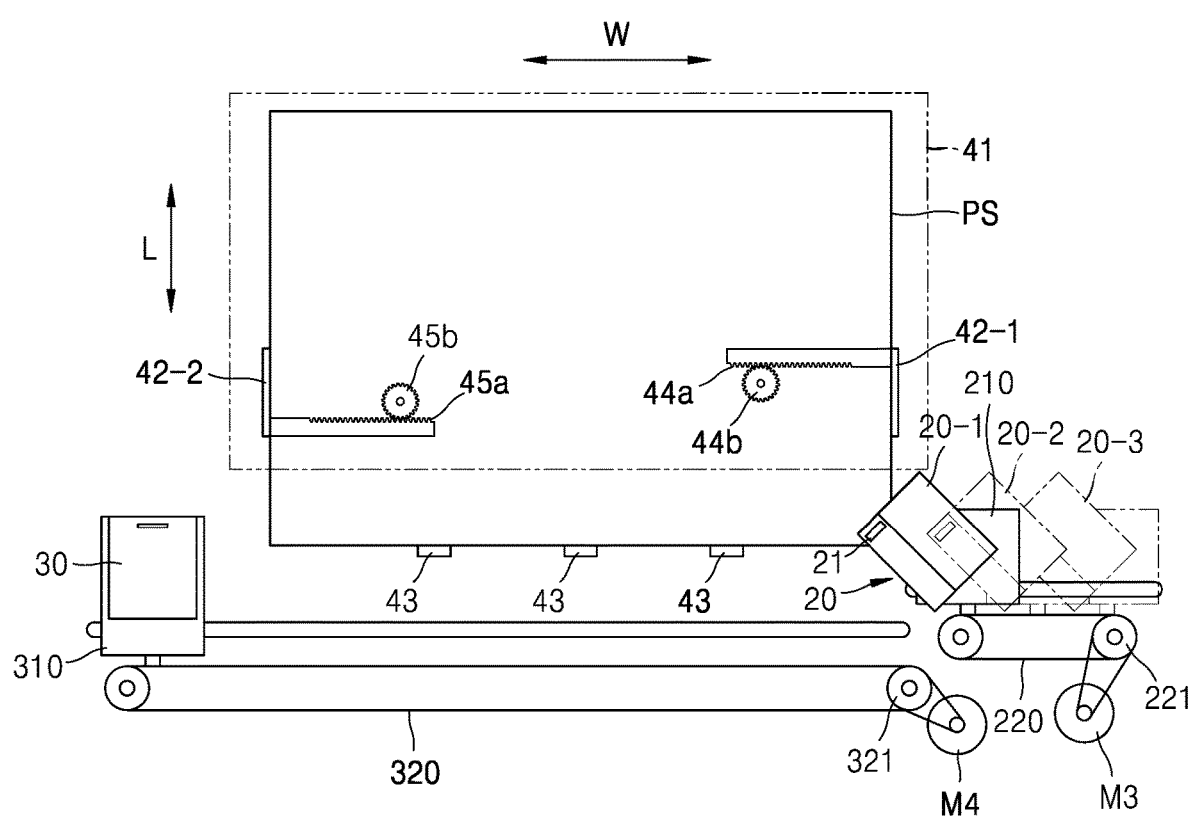
FIG. 2 is a schematic plan configuration view of an example of a post-processing apparatus illustrated in FIG. 1.
Figure 3:
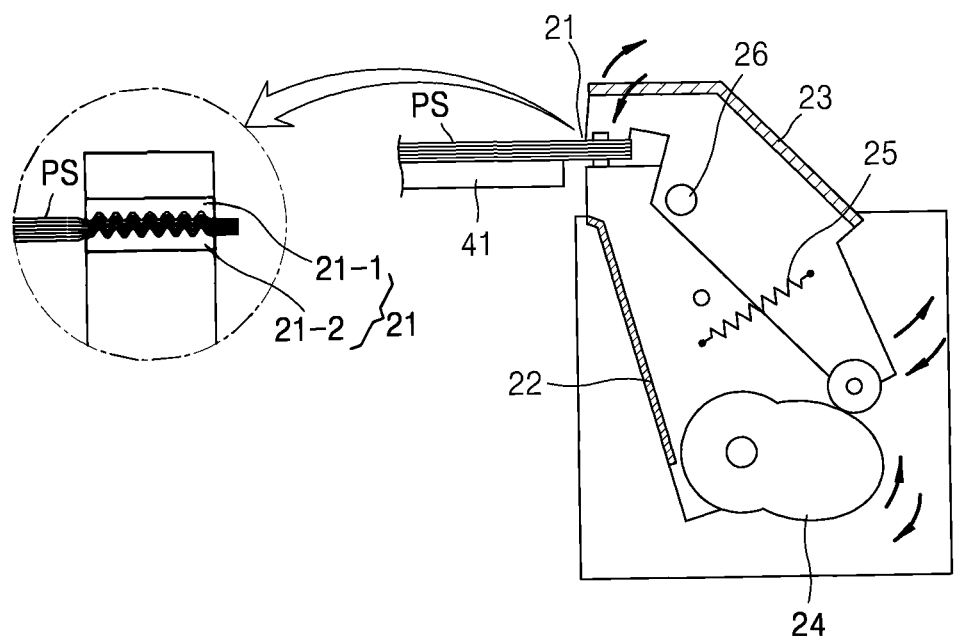
FIG. 3 is a schematic configuration view of an example of a first binder illustrated in FIG. 1.

FIG. 1 is a schematic side configuration view of an example of a post-processing apparatus. FIG. 2 is a schematic plan configuration view of an example of the post-processing apparatus illustrated in FIG. 1. FIG. 3 is a schematic configuration view of an example of a first binder 20 illustrated in FIG. 1.

Referring to FIGS. 1 to 3, the post-processing apparatus may include a paper alignment tray 40, a first binder 20, and a controller 100. The paper alignment tray 40 may include a loading table 41 on which a paper stack PS is loaded, and a side guide 42 and an end guide 43 to align ends in a width direction W and end in a length direction L of the paper stack PS, respectively. Herein, the paper stack PS includes one or more media such as papers, and reference to the paper stack PS or to a corner or a side of the paper stack PS may also refer to one or more media such as papers included in the paper stack PS or to the corners or the sides of the one or more media such as papers included the paper stack PS.

Referring again to FIGS. 1 to 3, the first binder 20 may include a binding unit to bind the paper stack PS on the paper alignment tray 40 in a stapleless manner. The first binder 20 is displaceable to a binding location 20-1 to bind the paper stack PS and a separation location 20-2 to separate the binding unit from the paper stack PS. The controller 100 moves the paper stack PS relative to the binding unit while displacing the first binder 20 from the binding location 20-1 to the separation location 20-2. A relative movement direction of the paper stack PS relative to the binding unit may be opposite to a direction in which the binding unit is moved by the displacement of the first binder 20. The controller 100 may move the paper stack PS in a width direction W by using the side guide 42 while displacing the first binder 20 from the binding location 20-1 to the separation location 20-2.

Referring to FIG. 1, the post-processing apparatus is provided with a transport structure to transport paper P and the paper stack PS. As one example, the transport structure may include transport rollers 11 and 12, a first roller 13, and a second roller 14. Each of the transport rollers 11 and 12 may include a pair of rollers that rotate while engaged with each other. The first roller 13 may be above the loading table 41, and the second roller 14 may be below the loading table 41. For example, the second roller 14 may be at a location that may come into contact with a lower surface of a sheet medium, for example, the paper P on the loading table 41. The first roller 13 is opposed to the second roller 14. The first roller 13 may be switched to a separation location (illustrated as a solid line in FIG. 1) separated from the second roller 14 and to a transport location (illustrated as a two-dot chain line in FIG. 1) to transport the paper P or the paper stack PS while engaged with the second roller 14. For example, the first roller 13 may be installed in a rotation lever 15. As the rotation lever 15 is rotated by an actuator, such as a solenoid, a linear motor, a rotary motor, or so on, the first roller 13 may be switched between the separation location and the transport location. While at the transport location, the first roller 13 may be pressed toward the second roller 14 by a weight thereof or by an elastic force of a spring, which is not illustrated. The first roller 13 and the second roller 14 may transport the paper P in a forward direction to discharge the paper to a discharge tray 50. The first roller 13 and the second roller 14 may transport the paper P in a reverse direction to align the paper on the loading table 41 to bind processing. The first roller 13 and the second roller 14 may transport the paper stack PS for which binding processing is completed in the forward direction to discharge to the discharge tray 50. The transport rollers 11 and 12 and the first and second rollers 13 and 14 may be driven by one or more motors.

As shown in the example of FIG. 2, the side guide 42 may include a first side guide 42-1 and a second side guide 42-2 that guide both ends of the width direction W of the paper stack PS. The first side guide 42-1 and the second side guide 42-2 may be moved in the width direction W. For example, the first side guide 42-1 and the second side guide 42-2 may be supported by the loading table 41 to be movable in the width direction W. In the present example, the first side guide 42-1 and the second side guide 42-2 are independently moved in the width direction W. As one example of a structure in which the first side guide 42-1 and the second side guide 42-2 are moved in the width direction W, a combination of rack and pinion may be employed. A rack gear 44a is provided in the first side guide 42-1, and a pinion 44b engages with the rack gear 44a. A rack gear 45a is provided in the second side guide 42-2, and a pinion 45b engages with the rack gear 45a. By rotating the pinions 44b and 45b, the first side guide 42-1 and the second side guide 42-2 may be moved in the width direction W. The motor M1 may move the first side guide 42-1 in the width direction W by rotating the pinion 44b. The motor M2 may rotate the pinion 45b to move the second side guide 42-2 in the width direction W.

The end guide 43 guides end of the longitudinal direction L of the paper P or the paper stack PS. The post-processing apparatus according to the present example is provided with multiple end guides 43 separated from each other in the width direction W. As a result, the second binder 30, as described below, may perform staple binding to drive staples into multiple locations in the width direction W. As needed, the post-processing apparatus may have a structure in which the end guide 43 is moved in the longitudinal direction L of the paper stack PS. For example, the post-processing apparatus may include a rack-pinion structure (not illustrated) disposed in the longitudinal direction L, and a motor (not illustrated) for rotating the pinion (not illustrated).

The first binder 20 is a stapleless binder to bind the paper stack PS in a stapleless manner without using a staple. For example, the first binder 20 may include a pressure binding unit 21. The pressure binding unit 21 includes a pair of pressure tooth shape portions 21-1 and 21-2 facing each other in a vertical direction with the paper stack PS therebetween. Each of the pair of pressure tooth shape portions 21-1 and 21-2 may include multiple concave portions and multiple convex portions arranged alternately. The concave portions and the convex portions of the pressure tooth shape portion 21-1 face the convex portions and the concave portions of the pressure tooth shape portion 21-2. When the paper stack PS is between the pair of pressure tooth shape portions 21-1 and 21-2, the pressure tooth shape portion 21-1 and the pressure tooth shape portion 21-2 approach each other to press the paper stack PS, and thus, the paper stack PS may be bound.

As one example, the first binder 20 may include a fixed frame 22 and a movable frame 23. The movable frame 23 is supported by the fixed frame 22 so that the movable frame 23 may be rotated around a hinge 26. The pressure tooth shape portion 21-2 is provided in the fixed frame 22, and the pressure tooth shape portion 21-1 is provided in the movable frame 23, When a cam 24 rotates, the cam 24 pushes the movable frame 23 to rotate the movable frame 23 so that the pressure tooth shape portion 21-1 approaches the pressure tooth shape portion 21-2. Accordingly, the paper stack PS is pressed between the pressure tooth shape portion 21-1 and the pressure tooth shape portion 21-2, and thus, stapleless binding is completed. When an interference between the cam 24 and the movable frame 23 is finished, the movable frame 23 is rotated by the elastic force of the spring 25 in a direction in which the pressure tooth shape portion 21-1 is separated from the pressure tooth shape portion 21-2.

The first binder 20 may be moved in the width direction W. For example, the first binder 20 may be mounted on a first movement base 210, and the first movement base 210 may be supported by a drive belt 220 traveling in the width direction W. A motor M3 may be connected to a pulley 221 supporting the drive belt 220 to make the drive belt 220 travel in the width direction W.

The post-processing apparatus may further include the second binder 30. The second binder 30 may drive a staple into the paper stack PS. Since a structure of the second binder 30 is well known to those skilled in the art, detailed description thereof will be omitted. The second binder 30 may be moved in the width direction W. For example, the second binder 30 is mounted on the second movement base 310. The second movement base 310 may be supported by the drive belt 320 traveling in the width direction W. A motor M4 may be connected to a pulley 321 supporting the drive belt 320 to make the drive belt 320 travel in the width direction W.

With this configuration, the second binder 30 may be moved in the width direction W to perform staple binding to drive a staple into an edge of the paper stack PS. The first binder 20 may be located at a location that does not interfere with a staple binding operation of the second binder 30. For example, the separation location 20-2 may be a location that does not interfere with the binding operation of the second binder 30. The first binder 20 may be moved to an evacuation location 20-3 further separated from the separation location 20-2 in the width direction W so as not to interfere with the binding operation of the second binder 30. The evacuation location 20-3 of the first binder 20 may be a location that does not interfere with the second binder 30 when the second binder 30 performs staple binding to a corner of the paper stack PS close to the first binder 20. When the stapleless binding is not performed, the first binder 20 may be located at the evacuation location 20-3.

Although not illustrated in the drawings, the post-processing apparatus may include one or more sensors. The one or more sensors may include one or more paper detection sensors to detect the paper P and the paper stack PS in a transport path of the paper P and in a transport path of the paper path PS. For example, the paper detection sensor may include a sensor to detect the paper P at a front end of the transport roller 11, a sensor to detect the paper P at a rear end of the transport roller 12, and a sensor to detect the paper P or the paper stack PS at a rear end of the first roller 13. The one or more sensors may include sensors to detect locations of the first and second side guides 42-1 and 42-2. The one or more sensors may include a sensor to detect a location of the first binder 20 and a sensor to detect a location of the second binder 30. Detection signals of the one or more sensors may be input to a controller 100.

The controller 100 may be implemented by various electrical components and electrical circuits that control a post-processing process, that is, the binding process. FIG. 1 illustrates schematically a configuration of the controller 100 relating to separation of the first binder 20 and the paper stack PS, as described below. The controller 100 may include a central processing unit (CPU) 110 and a motor driver 120 that controls a motor. Although not illustrated in the drawings, the controller 100 may include a memory in which a control program is stored. The central processing unit 110 may control a post-processing process by driving the control program stored in the memory. The controller 100 may control motors M1 M2, M3, and M4 through the motor driver 120. The controller 100 may control the motors M1, M2, M3, and M4 based on detection signals input from various sensors and post-processing commands input from an input unit (not illustrated) to control the post-processing apparatus such that the binding process is performed.

An operation of the example of the post-processing apparatus having this configuration will be briefly described.

A sheet medium, for example, the paper P, which is input to the post-processing apparatus through an inlet 91 is transported in the forward direction by the transport rollers 11 and 12. The first roller 13 is located at a separation location. The paper P passes between the first roller 13 and the second roller 14 and is discharged toward the discharge tray 50. When a rear end of the paper P leaves the transport roller 12, the rear end of the paper P falls onto the loading table 41. A front end of the paper P is located at the discharge tray 50 and the rear end of the paper P is located at the loading table 41. The first roller 13 is switched from the separation location to the transport location. The paper P is bitten (or grabbed) by a transport nip formed by the first roller 13 and the second roller 14.

When the binding processing is not performed, the first roller 13 rotates in the forward direction at the transport location. Then, the paper P is continuously transported in the forward direction and discharged to the discharge tray 50.

When the binding processing is performed, the first roller 13 rotates in the reverse direction at the transport location. Then, the paper P is transported in the reverse direction, and the rear end thereof comes into contact with the end guide 43 so that the paper P is aligned in the longitudinal direction L. The paper P is aligned in the width direction W by the first side guide 42-1 and the second side guide 42-2. Then, the first roller 13 is returned to the separation location. By repeating this process, multiple papers P are stacked on the loading table 41, whereby the paper stack PS is loaded on the loading table 41.

When stapleless binding is performed, the first binder 20 is moved to the binding location 20-1. In the binding location 20-1, the pressure binding unit 21 and a corner of the paper stack PS are aligned. The first binder 20 may press the corner of the paper stack PS by using the pressure binding unit 21 to perform the stapleless binding.

When staple binding is performed, the second binder 30 may be moved in the width direction W to drive a staple into the edge of the paper stack PS in at least one location in the width direction W.

When the binding is completed, the first roller 13 is switched from the separation location to the transport location. The paper stack PS is bitten (or grabbed) by the transport nip formed by the first roller 13 and the second roller 14. The first roller 13 rotates in the forward direction at the transport location. Then, the paper stack PS is transported in the forward direction and discharged to the discharge tray 50 through a discharge outlet 92.

As described above, in the stapleless binding, the corner of the paper stack PS (that is, the corners of the paper in the paper stack PS) is pressed by the pressure tooth shape portions 21-1 and 21-2. If the pressure tooth shape portions 21-1 and 21-2 are separated from each other, the paper stack PS has to be separated from the pressure tooth shape portions 21-1 and 21-2. However, when the stapleless binding is performed, there is a possibility that the paper stack PS is not separated by being caught between the pressure tooth shape portions 21-1 and 21-2. When the paper stack PS is discharged in this state, the paper stack PS may be skewed in the discharge process. The skew may cause a discharge jam. When the skew occurs, the paper stack PS is not evenly discharged on the discharge tray 50, and thus, the stack quality of the paper stack PS may be reduced. In addition, when the paper stack PS is moved in the discharge direction in a state in which the paper stack PS is not separated by being caught between the pressure tooth shape portions 21-1 and 21-2, a bound part may be loosened to separate the paper stack PS into sheets or a fastening force of the bound part may be weakened.

In order to separate the paper stack PS from the pressure tooth shape portion 21 before discharging the paper stack PS, a method of separating the paper stack PS from the first binder 20 in the width direction W by using the side guide 42, a method of twisting the paper stack PS, and so on may be considered. In a case of the method of separating the paper stack PS in the width direction W, the side guide 42 has to be moved in the width direction W, and since the first binder 20 is not moved, a movement distance of the side guide 42 may be increased, and thus, the time required to perform the separation operation increases. In a case of the method of twisting the paper stack PS, there is a possibility that skew occurs when the paper stack PS is discharged.

In the present example, after the stapleless binding is completed and before the paper stack PS is discharged, the first binder 20 and the paper stack PS are moved relative to each other in the width direction W to separate the paper stack PS from the pressure binding unit 21. To this end, the controller 100 moves the paper stack PS in the width direction W by using the side guide 42 at the same time while displacing the first binder 20 from the binding location 20-1 to the separation location 20-2. According to this, since the first binder 20 is displaced from the binding location 20-1 to the separation location 20-2, a movement amount of the side guide 42 may be reduced by the displacement of the first binder 20. Accordingly, the time required for a separation operation to separate the paper stack PS from the pressure binding unit 21 may be reduced. Since the paper stack PS is separated from the pressure binding unit 21 in the width direction W at a high speed, the paper stack PS may be smoothly separated from the pressure binding unit 21, In addition, unlike the method of twisting the paper stack PS, since the paper stack PS is moved in the width direction W while being guided by the side guide 42, a possibility that the paper stack PS is skewed may be reduced.

The first binder 20 may slide in the width direction W from the binding location 20-1 to be displaced to the separation location 20-2. The first binder 20 may be rotated from the binding location 20-1 and may also be displaced to the separation location 20-2. Hereinafter, examples in which the first binder 20 is displaced from the binding location 20-1 to the separation location 20-2 will be described.

In the present example, as illustrated in FIG. 2, the first binder 20 is slid from the binding location 20-1 in the width direction W to be displaced to the separation location 20-2. The controller 100 slides the first binder 20 from the binding location 20-1 to the outside of the paper stack PS in the width direction W to displace to the separation location 20-2, and moves the side guide 42 at the same time so that the paper stack PS is moved in a direction opposite to the sliding direction of the first binder 20.

Figure 4:
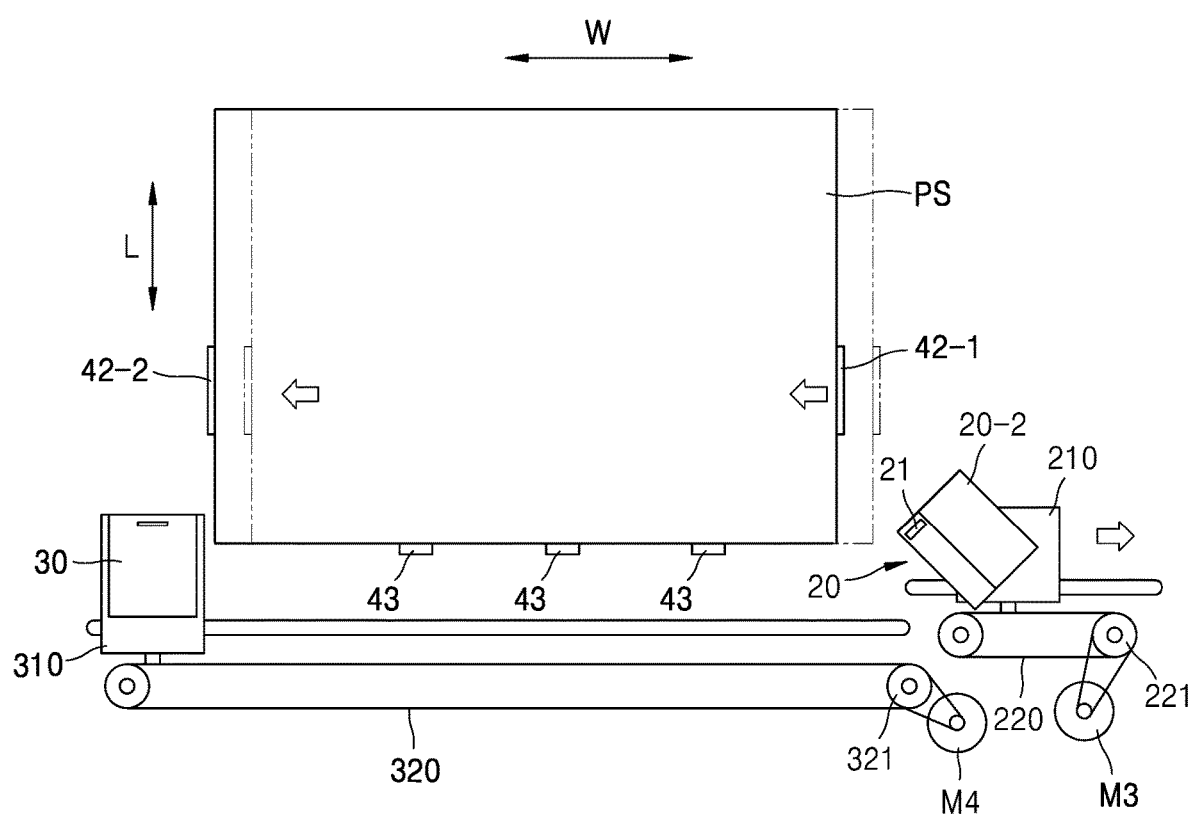
FIG. 4 is a schematic plan view illustrating a state in which a first binder is located at a separation location in one example of a post-processing apparatus illustrated in FIGS. 1 to 3.
Figure 5:
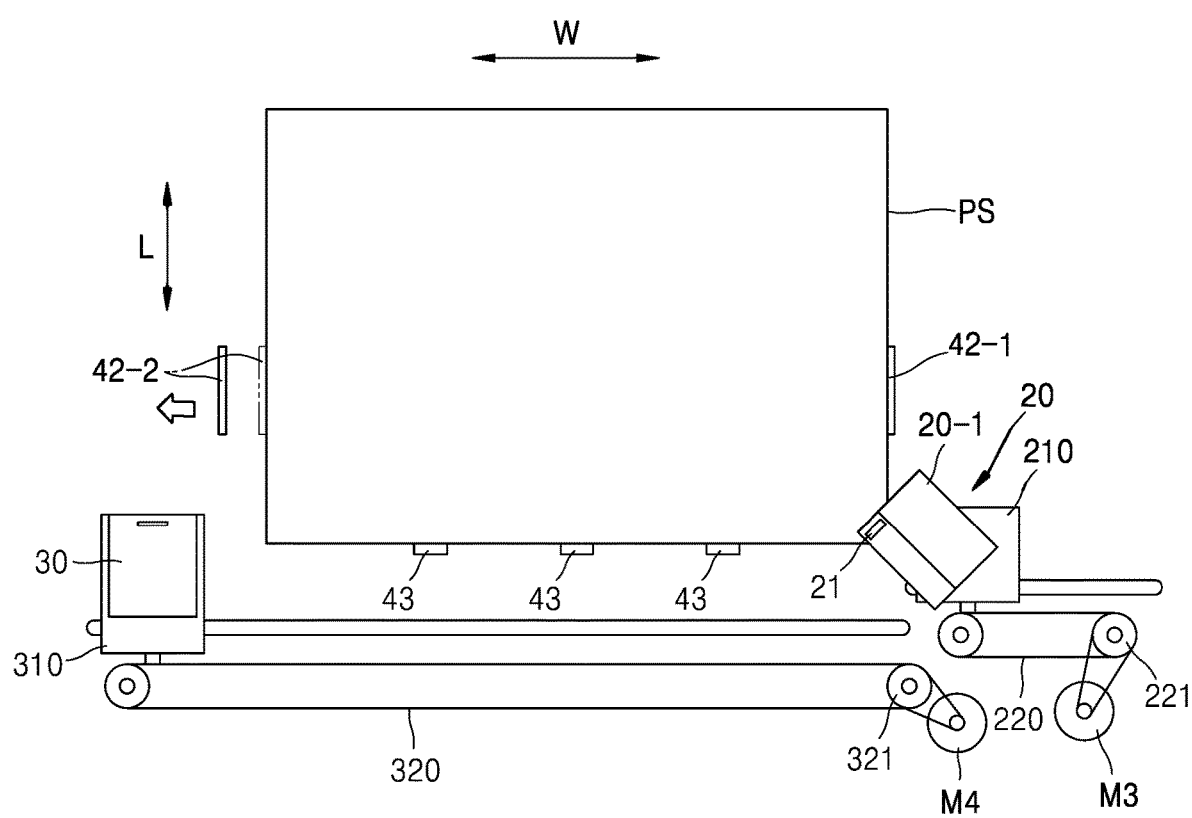
FIG. 5 is a schematic plan view illustrating a state in which a second side guide is separated from a paper stack in one example of a post-processing apparatus illustrated in FIGS. 1 to 3.

FIG. 4 is a schematic plan view illustrating a state in which the first binder 20 is located at the separation location 20-2 in one example of the post-processing apparatus illustrated in FIGS. 1 to 3. FIG. 5 is a schematic plan view illustrating a state in which the second side guide 42-2 is separated from the paper stack PS in one example of the post-processing apparatus illustrated in FIGS. 1 to 3.

Referring to FIGS. 1 to 5, examples of a process of separating the paper stack PS from the pressure binding unit 21 will be described. Hereinafter, when describing a movement direction of the first side guide 42-1 and the second side guide 42-2, that the first side guide 42-1 and the second side guide 42-2 are moved inwards in the width direction W means, for example, that the first side guide 42-1 and the second side guide 42-2 may be moved in a direction approaching each other, and that the first side guide 42-1 and the second side guide 42-2 are moved outwards in the width direction W means, for example, that the first side guide 42-1 and the second side guide 42-2 may be moved in a direction separating from each other.

As illustrated in FIG. 2, the controller 100 aligns the paper stack PS on the loading table 41 and aligns the pressure binding unit 21 with a corner of the paper stack PS by driving the motor M3 to make the first binder 20 be located at the binding location 20-1. The controller 100 drives the cam 24 to make the pair of pressure tooth shape portions 21-1 and 21-2 approach each other to bind the paper stack PS in a stapleless manner, and then, separating the pair of pressure tooth shape portions 21-1 and 21-2.

Then, as illustrated in FIG. 4, the controller 100 drives the motor M3 to slide the first binder 20 to the outside of the paper stack PS in the width direction W to displace the first binder 20 to the separation location 20. At the same time, the controller 100 moves the first side guide 42-1 and the second side guide 42-2 in a direction opposite to the sliding direction of the first binder 20. That is, the controller 100 drives the motors M1 and M2 so that the first side guide 42-1 close to the first binder 20 is moved inwards in the width direction W and the second side guide 42-2 distant from the first binder 20 is moved outwards in the width direction W. As such, the paper stack PS and the first binder 20 are separated from each other in the width direction W, and thus, the corner of the paper stack PS may be easily separated from the pressure binding unit 21.

In another example, the controller 100 may move the second side guide 42-2 outwards in the width direction W before displacing the first binder 20 to the separation location 20-2, and then, may move the first side guide 42-1 inwards in the width direction W while displacing the first binder 20 from the binding location 20-1 to the separation location 20-2. That is, the controller 100 may first drive the motor M2 to move the second side guide 42-2 distant from the first binder 20 outwards in the width direction W, that is, in a direction being separated from the first binder 20 as illustrated in FIG. 5. Thereafter, the controller 100 may drive the motor M3 to slide the first binder 20 to the outside of the paper stack PS in the width direction W to displace the first binder 20 to the separation location 20-2 as illustrated in FIG. 4, and drive the motor M1 to move the first side guide 42-1 close to the first binder 20 inwards in the width direction W, that is a direction being separated from the first binder 20 at the same time. Accordingly, while the paper stack PS is separated from the first binder 20 in the width direction W, the corner of the paper stack PS may be easily separated from the pressure binding unit 21.

Next, the controller 100 may drive the first roller 13 and the second roller 14 in the forward direction to discharge the paper stack PS to the discharge tray 50 through the discharge outlet 92.

In the above-described example of the post-processing apparatus, the first binder 20 and the second binder 30 may be driven separately by the motor M3 and the motor M4, respectively, but the first binder 20 and the second binder 30 may be driven by a single motor.

Figure 6:
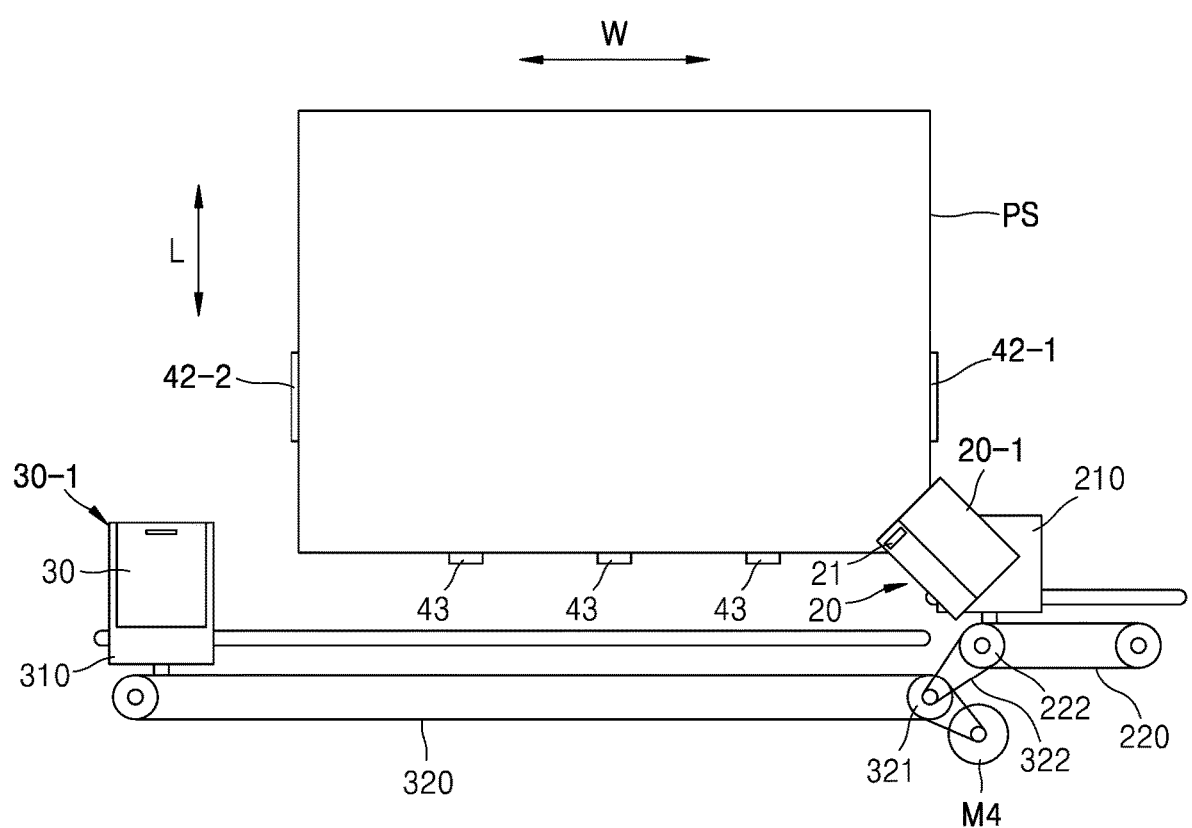
FIG. 6 is a schematic plan view of one example of a post-processing apparatus.
Figure 7:
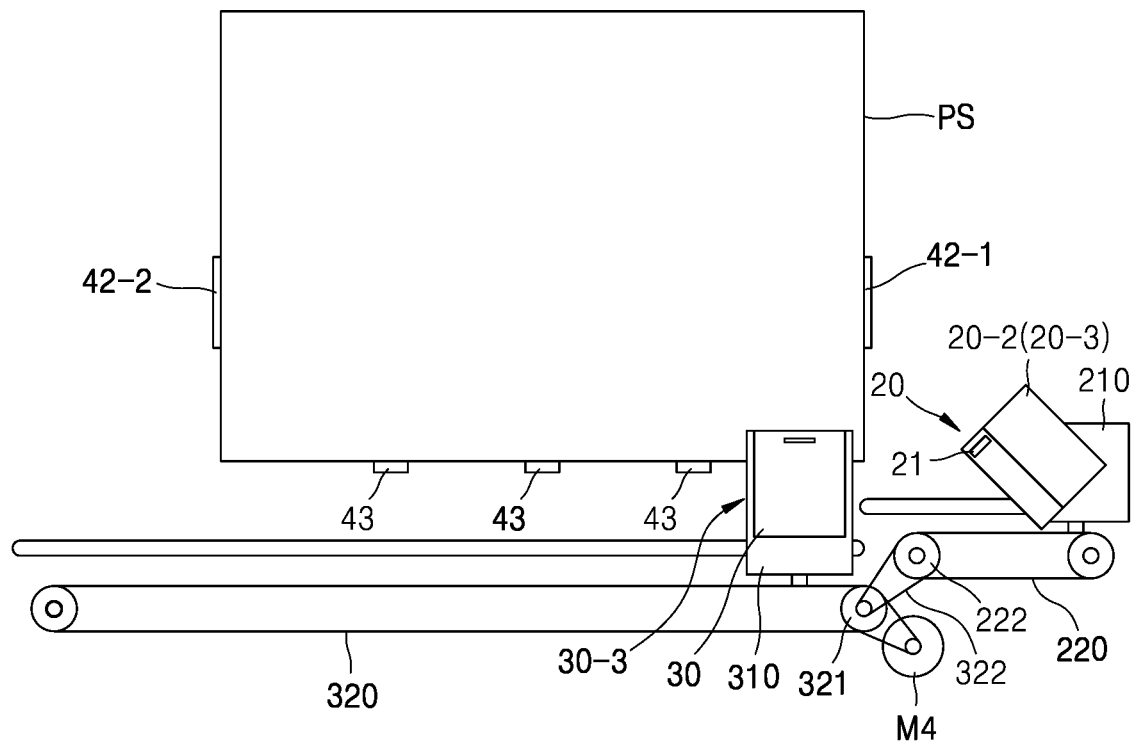
FIG. 7 illustrates a state in which a first binder is located at a separation location in one example of a post-processing apparatus illustrated in FIG. 6.

FIG. 6 is a schematic plan view of one example of the post-processing apparatus. FIG. 7 illustrates a state in which the first binder 20 is located at a separation location in one example of the post-processing apparatus illustrated in FIG. 6. Examples of the post-processing apparatuses illustrated in FIGS. 6 and 7 have a difference from the examples of the post-processing apparatuses illustrated in FIGS. 2 to 5 in that the first binder 20 and the second binder 30 are driven by a single motor. Hereinafter, the difference will be mainly described, and the same configuration elements as the configuration elements illustrated in FIGS. 2 to 5 are denoted by the same reference numerals and redundant descriptions thereof will be omitted.

Referring to FIGS. 6 and 7, the first binder 20 is driven by the motor M4 to move the second binder 30 in the width direction W to be moved in the width direction W. As one example, a pulley 321 supporting the drive belt 320 and the pulley 222 supporting the drive belt 220 may be connected by the belt 322. The motor M4 rotates the pulley 321. When the motor M4 rotates, the drive belt 320 and the drive belt 220 travel in the same direction. Accordingly, the first binder 20 and the second binder 30 are moved together in the width direction W.

As illustrated in FIG. 6, when the first binder 20 is located at the binding location 20-1, the second binder 30 may be located at the evacuation location 30-1 escaped from the paper stack PS. As illustrated in FIG. 7, when the first binder 20 is located at the separation location 20-2 or the evacuation location 20-3, the second binder 30 may be located at a location 30-3 the most distant from the evacuation location 30-1. The location 30-3 may be a location at which a staple may be driven into the corner of the paper stack PS close to the first binder 20. Since movement distances of the first binder 20 and the second binder 30 in the width direction W are different from each other, an effective diameter ratio between the pulley 222 and the pulley 321 is equal to a ratio between the movement distances of the first binder 20 and the second binder 30. Although not illustrated in the drawings, a deceleration unit that equalizes a ratio between rotation amounts of the pulley 222 and the pulley 321 and a ratio between the movement distances of the first binder 20 and the second binder 30 may be interposed between the pulley 222 and the pulley 321.

With this configuration, the motor M3 to move the first binder 20 may be omitted, a cost of the post-processing apparatus may be reduced.

Figure 8:
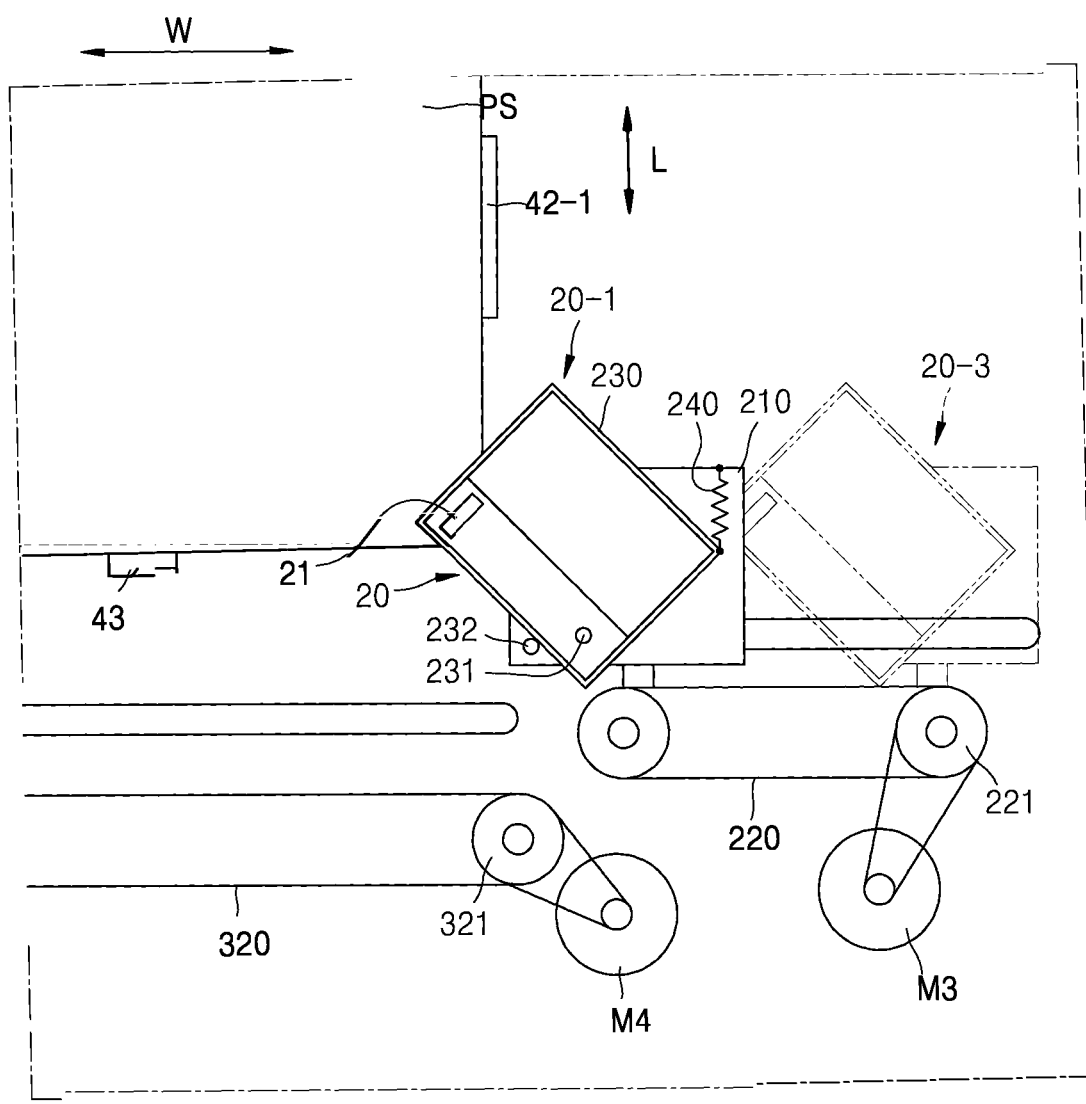
FIG. 8 is a schematic plan view of one example of a post-processing apparatus.
Figure 9:
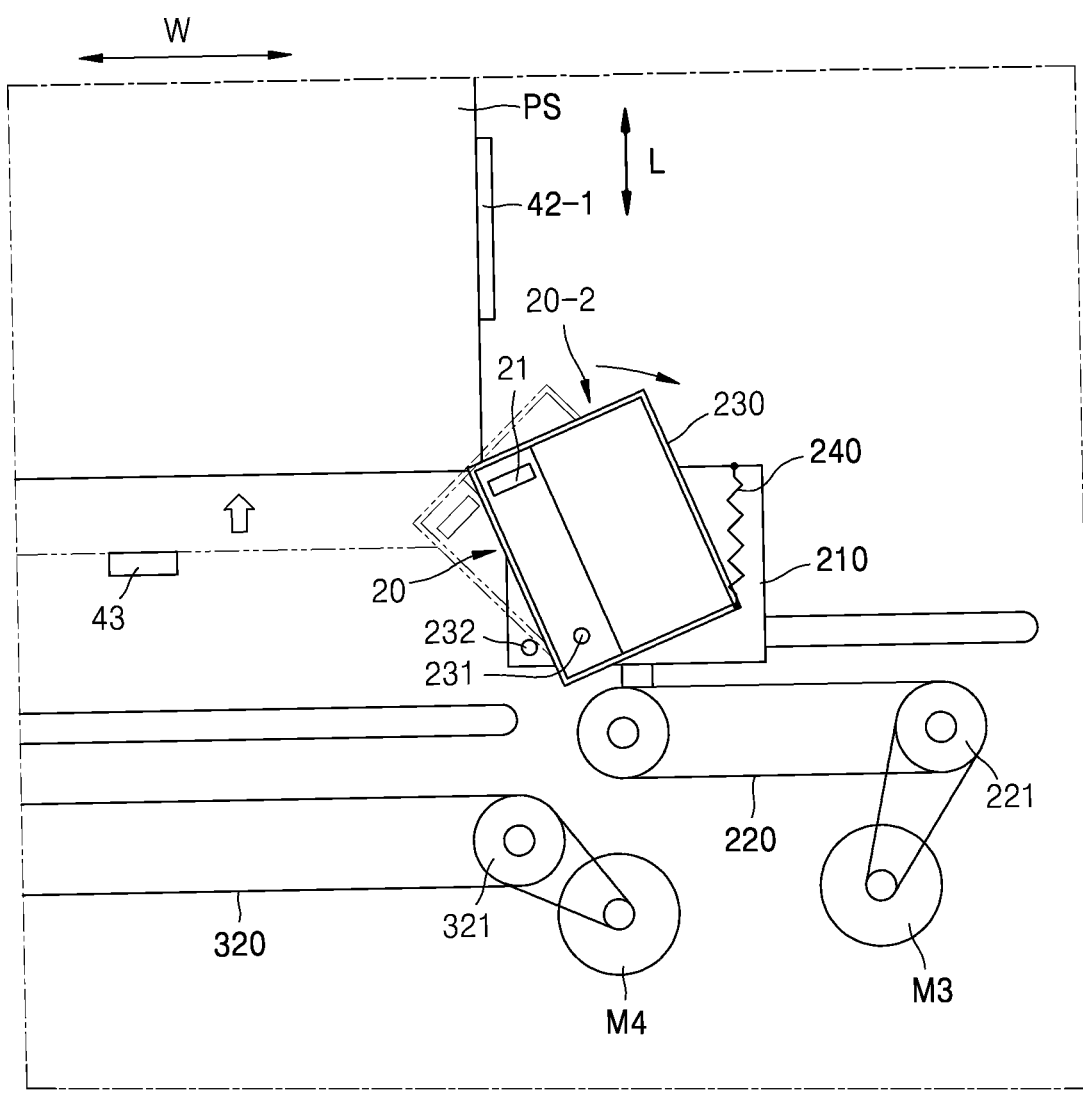
FIG. 9 illustrates a state in which a first binder is located at a separation location in one example of a post-processing apparatus illustrated in FIG. 8.

FIG. 8 is a schematic plan view of one example of the post-processing apparatus, FIG. 9 illustrates a state in which the first binder 20 is located at the separation location 20-2 in the example of the post-processing apparatus illustrated in FIG. 8. The post-processing apparatus according to the present example is different from the examples of the post-processing apparatuses illustrated in FIGS. 2 to 7 in that the first binder 20 is rotated from the binding location 20-1 to be displaced to the separation location 20-2. In FIGS. 8 and 9, only a rotation structure of the first binder 20 is illustrated, and the same configuration elements as the configuration elements illustrated in FIGS. 2 to 7 are denoted by the same reference numerals and redundant description thereof will be omitted.

Referring to FIGS. 1, 8, and 9, the post-processing apparatus includes the paper alignment tray 40 that includes the loading table 41 for stacking the paper stack PS thereon and the side guide 42 and the end guide 43 to align sides of the width direction W and end of the longitudinal direction L of the paper stack PS, respectively, and the first binder 20 that includes the binding unit to bind the paper stack PS on the paper alignment tray 40 in a stapleless manner and is rotatable to the binding location 20-1 to bind the paper stack PS and the separation location 20-2 to separate the binding unit from the paper stack PS, and the elastic member 240 for applying an elastic force to the first binder 20 in a direction being located at the binding location 20-1.

The first binder 20 binds the paper stack PS in a stapleless manner. For example, the first binder 20 may include the pressure binding unit 21 as described above. The first binder 20 may be rotated to the binding location 20-1 and the separation location 20-2. The separation location 20-2 may be a direction in which the pressure binding unit 21 is moved to the outside of the paper stack PS in the width direction W. The post-processing apparatus may include a rotation base 230 supported by the first movable base 210 so as to be rotatable around the hinge 231. The first binder 20 is installed on the rotation base 230. The hinge 231 becomes the center of rotation of the first binder 20 and is located outside of the paper stack PS. The first movement base 210 may be connected to the drive belt 220 traveling in the width direction W according to the motor M3. The elastic member 240 may be implemented by, for example, a tensile coil spring connected to the first movement base 210 and the rotation base 230. The rotation base 230 comes into contact with a stopper 232 provided in the first movement base 210 at the binding location 20-1. Accordingly, the first binder 20 may not be rotated beyond the binding location 20-1 and may be maintained at the binding location 20-1 by the elastic force of the elastic member 240.

An example of a process of separating the paper stack PS from the pressure binding unit 21 will be described with reference to FIGS. 1, 8, and 9.

The controller 100 aligns the paper stack PS on the loading table 41 and aligns the pressure binding unit 21 with the corner of the paper stack PS by driving the motor M3 to make the first binder 20 be located at the binding location 20-1 as illustrated in FIG. 8. In this state, the controller 100 drives the first binder 20 to bind the paper stack PS in a stapleless manner.

Then, the controller 100 drives the first roller 13 and the second roller 14 to discharge the paper stack PS. At this time, if the paper stack PS is bitten (or grabbed) by the pressure binding unit 21, the first binder 20 is pulled in the discharge direction by the paper stack PS being discharged. Then, as illustrated in FIG. 9, the rotation base 230 is rotated around the hinge 231 to be displaced toward the separation location 20-2. The pressure binding unit 21 is moved to the outside of the paper stack PS in the width direction W. In addition, an elastic force in a direction to rotate the first binder 20 to the binding location 20-1 is applied to the first binder 20 by the elastic member 240, and the greater the amount of rotation of the rotation base 230, the greater the elastic force. The first binder 20 is pulled in a direction opposite to the discharge direction of the paper stack PS by the elastic member 240. Accordingly, the paper stack PS may be separated from the pressure binding unit 21 by movement of the paper stack PS in the discharge direction and rotation of the first binder 20 to the separation location 20-2. If the paper stack PS is separated from the pressure binding unit 21, the first binder 20 is rotated toward the binding location 20-1 by the elastic force of the elastic member 240, and the rotation base 230 is maintained at the binding location 20-1 by coming into contact with the stopper 232.

Since discharge of the paper stack PS and rotation of the first binder 20 to the separation location 20-2 are performed simultaneously, and the end of the paper stack PS in the width direction W is guided by the first side guides 42-1 and the second side guide 42-2, the skew of the paper stack PS is unlikely to occur. In addition, since the first binder 20 is rotated to the separation location 20-2 by a discharge operation of the paper stack PS, there is no need to provide a separate drive structure for rotating the first binder 20 to the separation location 20-2. Accordingly, the structure of the post-processing apparatus is simple, and thus, a manufacturing cost may be reduced.

When the second binder 30 is provided, the controller 100 may drive the motor M3 to move the first binder 20 to the evacuation location 20-3 so that the second binder 30 may perform a binding operation at the location 30-3 of FIG. 7.

Figure 10:
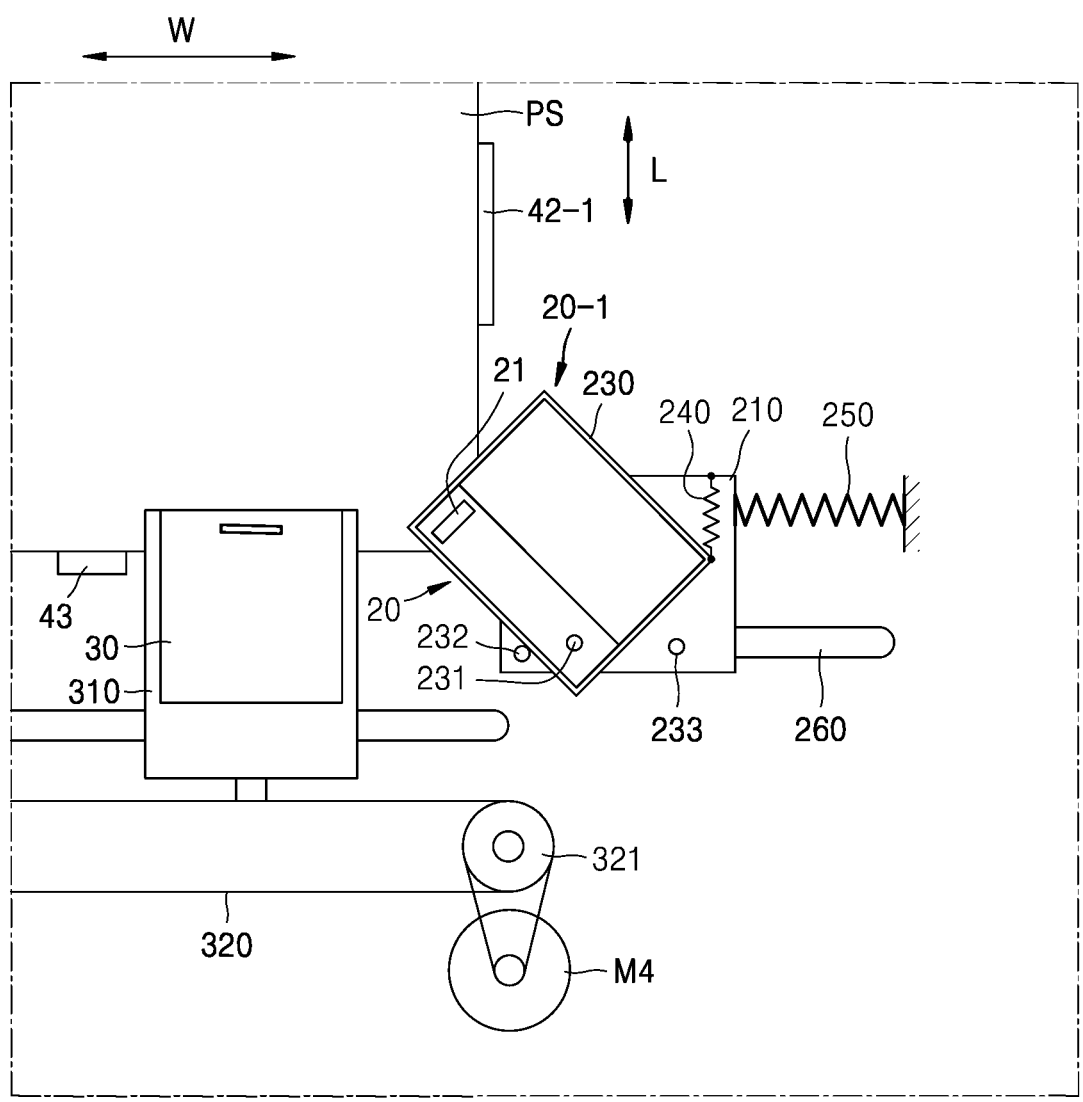
FIG. 10 is a schematic plan view of one example of a post-processing apparatus and illustrates a state in which a first binder is located at a binding location.
Figure 11:
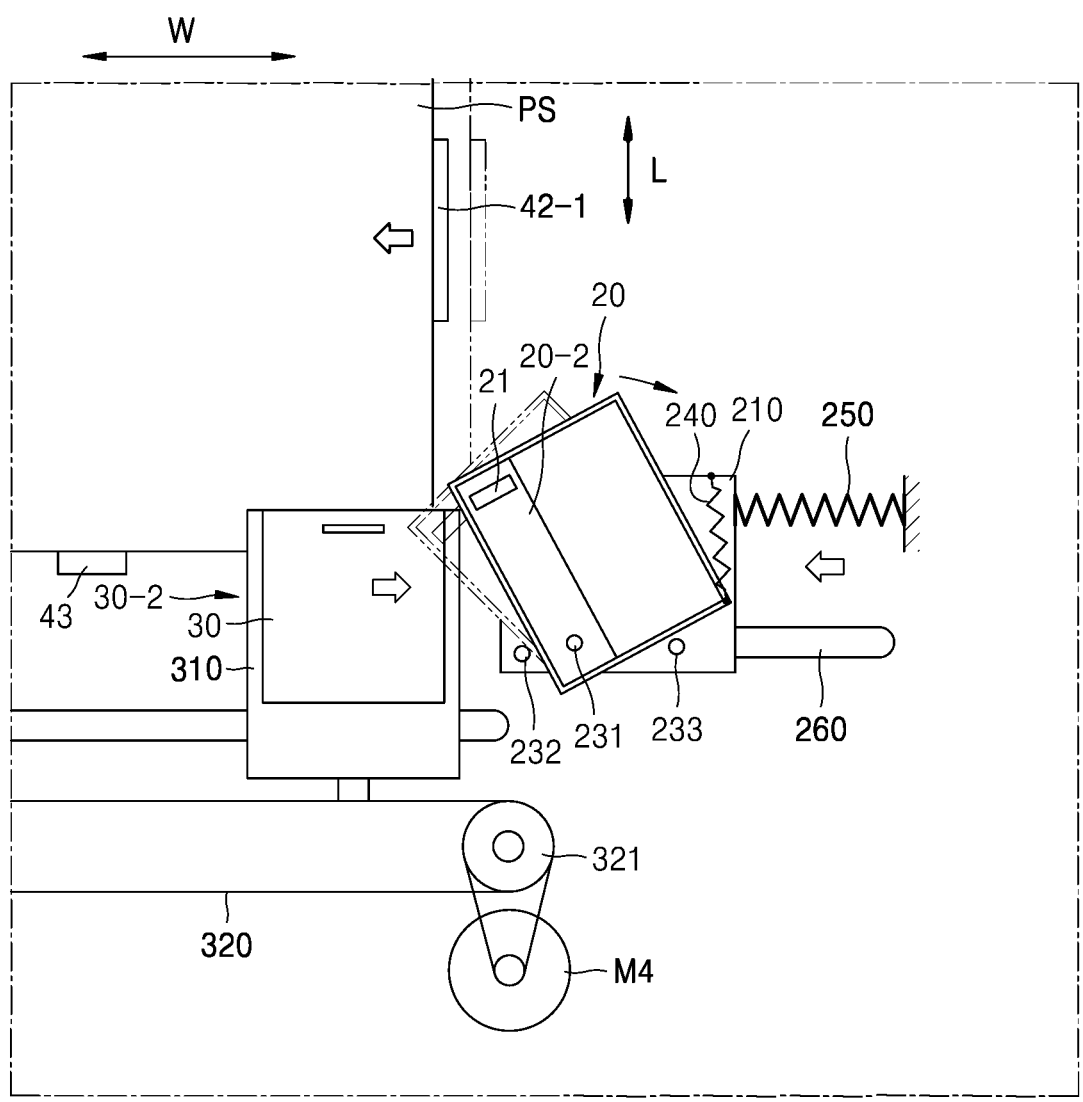
FIG. 11 illustrates a state in which a first binder is located at a separation location in one example of a post-processing apparatus illustrated in FIG. 10.
Figure 12:
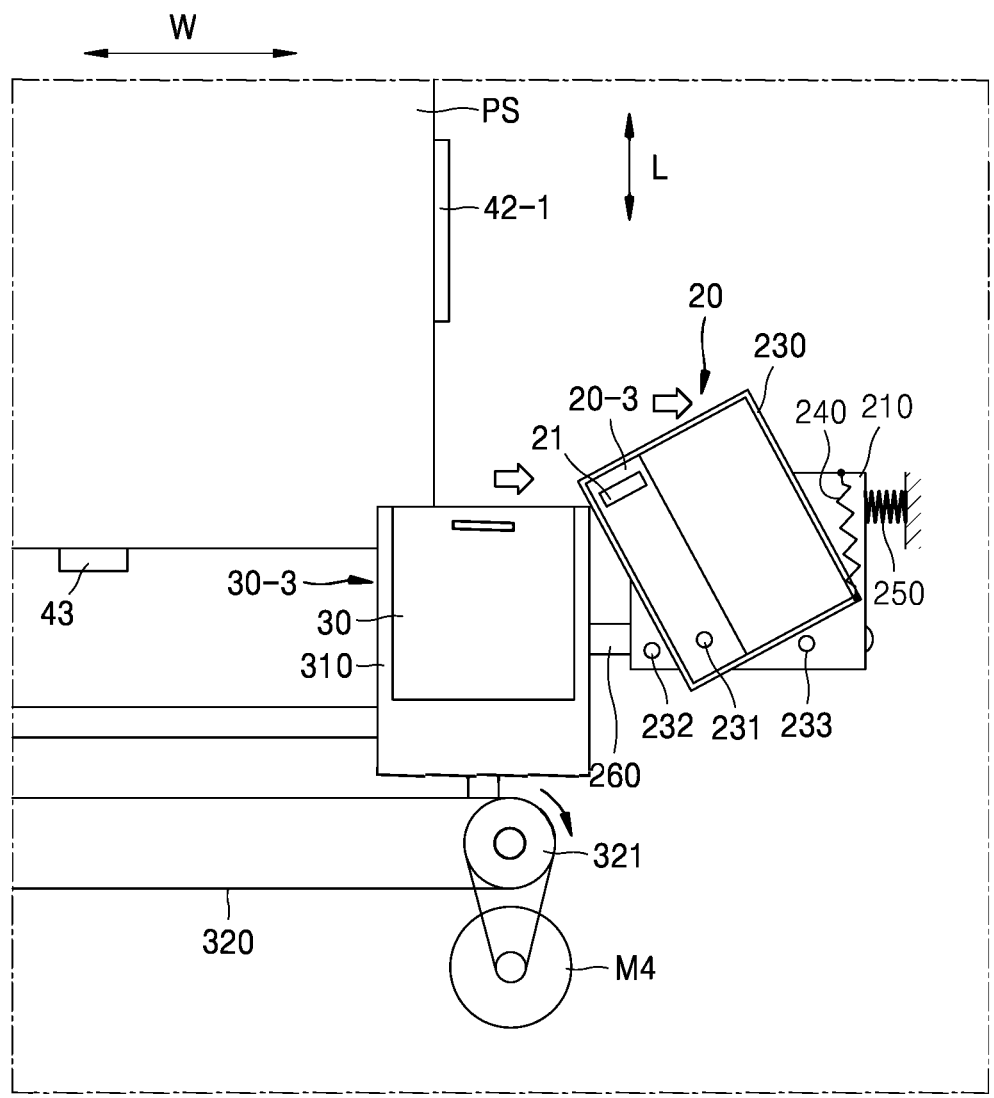
FIG. 12 illustrates a state in which a first binder is located at an evacuation location in one example of a post-processing apparatus illustrated in FIG. 10.

FIG. 10 is a schematic plan view of an example of the post-processing apparatus and illustrates a state in which the first binder 20 is located at the binding location 20-1. FIG. 11 illustrates a state in which the first binder 20 is located at the separation location 20-2 in one example of the post-processing apparatus illustrated in FIG. 10. FIG. 12 illustrates a state in which the first binder 20 is located at the evacuation location 20-3 in one example of the post-processing apparatus illustrated in FIG. 10.

The post-processing apparatus according to the present example is different from the examples of the post-processing apparatus illustrated in FIGS. 8 and 9 in that the first binder 20 is rotated from the binding location 20-1 to the separation location 20-2 by movement of the second binder 30 in the width direction W. Hereinafter, the same configuration elements as the configuration elements previously described are denoted by the same reference numerals and redundant description thereof will be omitted.

Referring to FIG. 1 and FIGS. 10 to 12, the first binder 20 may be rotated to the binding location 20-1 and the separation location 20-2. The first binder 20 is displaced to the separation location 20-2. The hinge 231 becomes the center of rotation of the first binder 20 and is located outside the paper stack PS. Accordingly, the separation location 20-2 may be a location where the pressure binding unit 21 is moved to the outside of the paper stack PS in the width direction W. The first binder 20 is installed on the rotation base 230. The rotation base 230 is supported to the first movable base 210 to be rotatable around the hinge 231. Since the hinge 231 is located outside the paper stack PS aligned in the loading table 41, the first binder 20 may be rotated to the separation location 20-2 by rotating to the outside of the paper stack PS, based on the width direction W of the paper stack PS.

The elastic member 240 applies an elastic force in a direction located at the binding location 20-1 to the first binder 20. The elastic member 240 may be implemented by, for example, a tensile coil spring connected to the first movement base 210 and the rotation base 230. The rotation base 230 comes into contact with the stopper 232 provided in the first movement base 210 at the binding location 20-1. Accordingly, the first binder 20 may not be rotated beyond the binding location 20-1 and may be maintained at the binding location 20-1 by the elastic force of the elastic member 240.

The first movement base 210 may slide in the width direction W. For example, the first movement base 210 may slide in the width direction W by being guided to a first guide rail 260 extending in the width direction W. A sliding range of the first movement base 210 may correspond to the binding location 20-1 and the evacuation location 20-3 of the first binder 20. A second elastic member 250 applies an elastic force in a direction to slide to the binding location 20-1 to the first binder 20. For example, the second elastic member 250 may be implemented by a compression coil spring of which an end is supported by the first movement base 210.

The second binder 30 is installed in the second movement base 310. The second movement base 310 is supported by the drive belt 320 which travels in the width direction W by the motor M4. The second binder 30 may drive a staple into the edge of the paper stack PS at one or more locations in the width direction W. As illustrated in FIG. 11, the second binder 30 may be moved to an interference location 30-2 in the width direction W to rotate the first binder 20 from the binding location 20-1 to the separation location 20-2 by pushing the first binder 20. If the first binder 20 reaches the separation location 20-2, the rotation base 230 comes into contact with the stopper 233. The stopper 233 prevents the first binder 20 from rotating any more beyond the separation location 20-2. The stopper 233 may be provided in, for example, the first movement base 210.

The first binder 20 may slide to the evacuation location 20-3 separated from the paper stack PS in the width direction W by being pushed by the second binder 30 moving beyond the interference location 30-2. Since the first binder 20 may not be rotated beyond the separation location 20-2, if the second binder 30 is moved in the width direction W beyond the interference location 30-2, the first movement base 210 is moved in the width direction W by being pushed by the second binder 30. As illustrated in FIG. 12, the second binder 30 may be moved to a location 30-3 at which a staple may be driven into a corner of the paper stack PS close to the first binder 20. At this time, the first binder 20 may reach the evacuation location 20-3. With this configuration, the second binder 30 may be moved to a certain location in the width direction W to perform staple binding to drive a staple into the edge of the paper stack PS.

If the second binder 30 is moved from the location 30-3 toward the interference location 30-2, the first binder 20 is moved toward the paper stack PS due to the elastic force of the second elastic member 250. If the second binder 30 reaches the interference location 30-2, the movement of the first binder 20 in the width direction W stops. If the second binder 30 is moved to the evacuation location 30-1 beyond the interference location 30-2, the first binder 20 is rotated from the separation location 20-2 to the binding location 20-1 due to the elastic force of the elastic member 240. If interference between the second movement base 310 and the rotation base 230 ends, the first binder 20 reaches the binding location 20-1. The rotation base 230 comes into contact with the stopper 232, and the first binder 20 is maintained at the binding location 20-1.

As such, since the first binder 20 may be moved to the binding location 20-1, the separation location 20-2, and the evacuation location 20-3 by using the second binder 30, the motor M3 to drive the one binder 20 may be omitted. Accordingly, a manufacturing cost of the post-processing apparatus may be reduced.

An example of a process of separating the paper stack PS from the pressure binding unit 21 will be described with reference to FIG. 1 and FIGS. 10 to 12.

The controller 100 aligns the paper stack PS on the loading table 41. As illustrated in FIG. 10, the controller 100 aligns the pressure binding unit 21 with the corner of the paper stack PS by making the first binder 20 be located at the binding location 20-1. In this state, the controller 100 drives the first binder 20 to bind the paper stack PS in a stapleless manner.

Then, the controller 100 moves the second binder 30 in the width direction W to push the first binder 20 in a direction opposite to the elastic force of the elastic member 240, thereby rotating the first binder 20 from the binding location 20-1 to the separation location 20-2. In the present example, the controller 100 rotates the first binder 20 around the hinge 231 located outside the paper stack PS to displace the first binder 20 to the separation location 20-2.

For example, the controller 100 drives the motor M3 to move the second binder 30 to the interference location 30-2. When the second binder 30 approaches the interference location 30-2, the second movement base 310 comes into contact with the rotation base 230. Subsequently, when the second binder 30 is moved to the interference location 30-2, the rotation base 230 is rotated around the hinge 231 by being pushed by the second movement base 310. When the second binder 30 reaches the interference location 30-2, the first binder 20 reaches the separation location 20-2 as illustrated in FIG. 11. At this time, the first movement base 210 may be slightly pushed toward the evacuation location 20-3 in the width direction W. An elastic modulus of the second elastic member 250 may be greater than an elastic modulus of the elastic member 240 such that the first binder 20 may be rotated from the binding location 20-1 to the separation location 20-2 when the second binder 30 is moved to the interference location 30-2.

When the first binder 20 is rotated from the binding location 20-1 to the separation location 20-2, the pressure binding unit 21 is moved outwards in the width direction W while being twisted with respect to the paper stack PS. In this process, the pressure binding unit 21 may be separated from the paper stack PS. Since the first binder 20 is moved from the binding location 20-1 to the separation location 20-2 by using the second binder 30, the motor M3 to drive the first binder 20 may be omitted. Accordingly, the post-processing apparatus that may smoothly separate the pressure binding unit 21 from the paper stack PS and reduces a manufacturing cost may be implemented. In addition, since the first binder 20 is twisted in a state in which both ends in the width direction W are guided by the first side guide 42-1 and the second side guide 42-2, a possibility that skew occurs in the paper stack PS may be reduced compared to a method of twisting the paper stack PS.

While the first binder 20 is rotated from the binding location 20-1 to the separation location 20-2 by using the second binder 30, the paper stack PS may be moved in the width direction as described above. The controller 100 may move the first side guide 42-1 and the second side guide 42-2 in a direction opposite to the movement direction of the first binder 20. For example, as described with reference to FIG. 4, the controller 100 may drive the motors M1 and M2 to move the first side guide 42-1 close to the first binder 20 inwards in the width direction W and to move the second side guide 42-2 distant from the first binder 20 outwards in the width direction W. In addition, before rotating the first binder 20 to the separation location 20-2, the controller 100 may move the second side guide 42-2 outwards in the width direction W as described with reference to FIG. 5 and move the first side guide 42-1 inwards in the width direction W while rotating the first binder 20 from the binding location 20-1 to the separation location 20-2 as described with reference to FIG. 4. Accordingly, while the paper stack PS is separated from the first binder 20 in the width direction W, the corner of the paper stack PS may be more easily separated from the pressure binding unit 21.

Next, the controller 100 may drive the first roller 13 and the second roller 14 to discharge the paper stack PS to the discharge tray 50 through the discharge hole 92.

Figure 13:
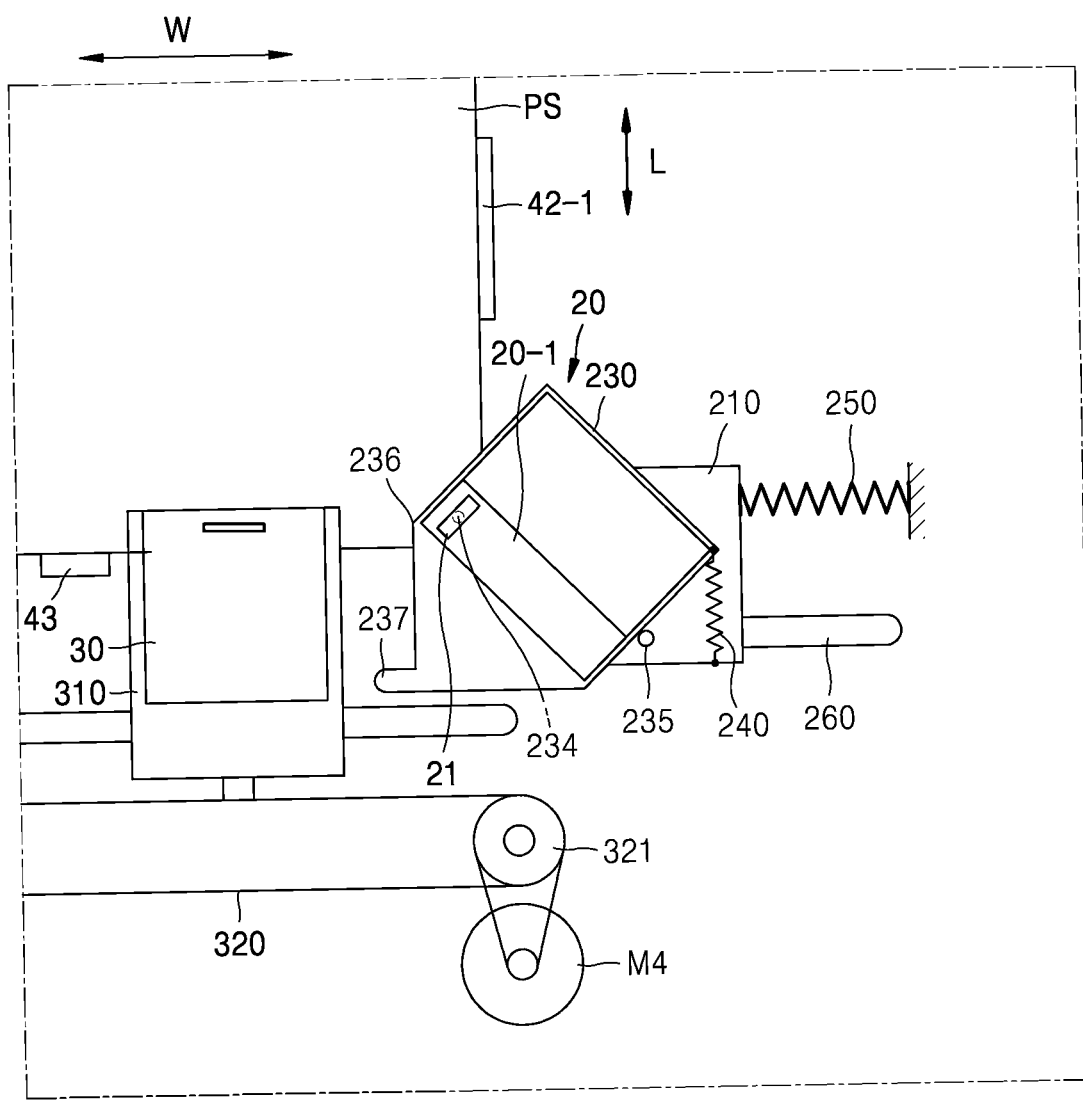
FIG. 13 is a schematic plan view of an example of a post-processing apparatus and illustrates a state in which a first binder is located at a binding location.
Figure 14:
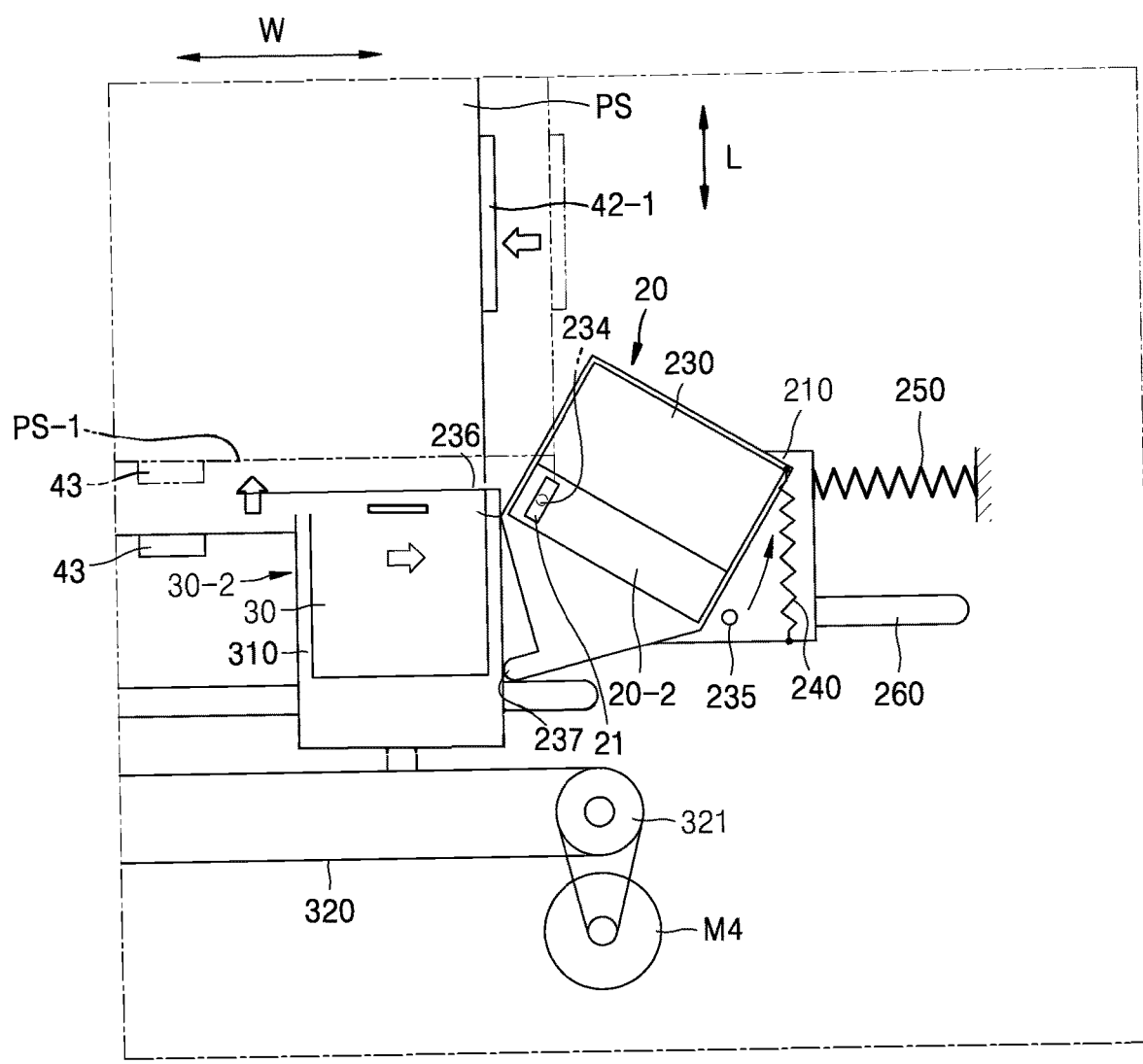
FIG. 14 illustrates a state in which a first binder is located at a separation location in one example of a post-processing apparatus illustrated in FIG. 13.
Figure 15:
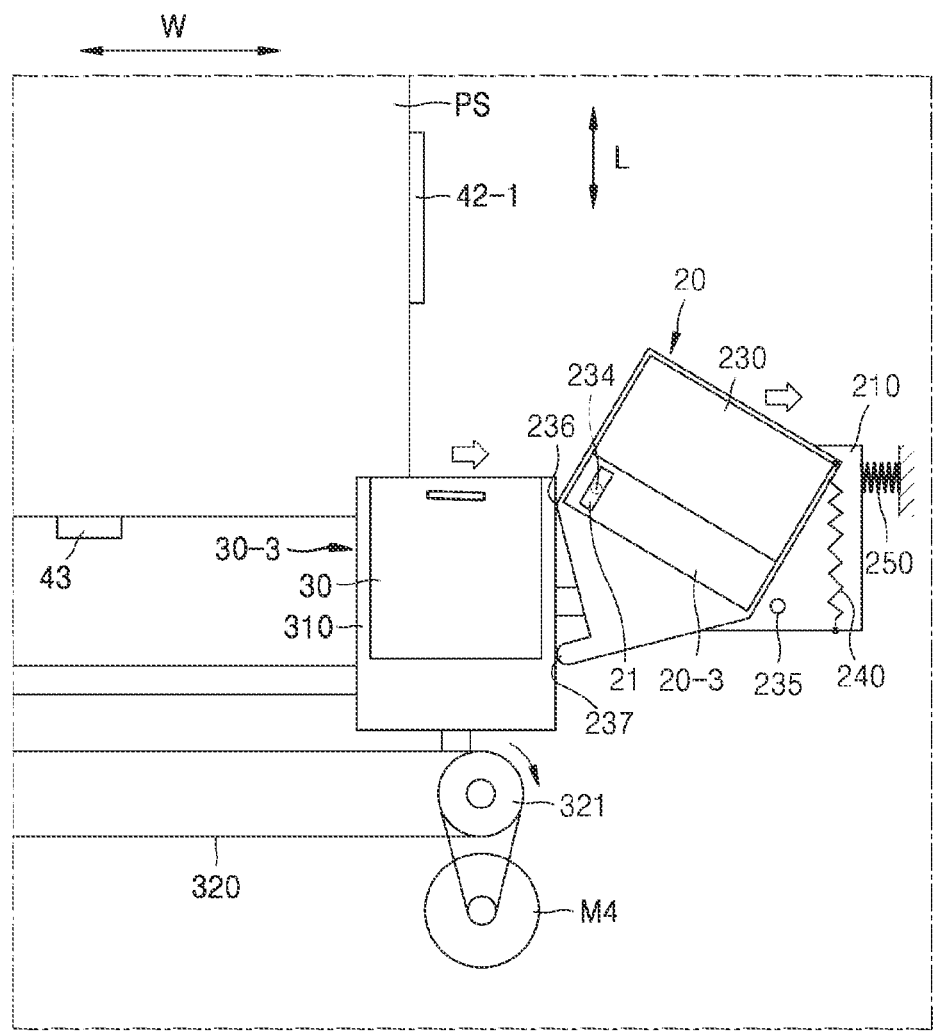
FIG. 15 illustrates a state in which a first binder is located at an evacuation location in one example of a post-processing apparatus illustrated in FIG. 13.

FIG. 13 is a schematic plan view of an example of the post-processing apparatus and illustrates a state in which the first binder 20 is located at the binding location 20-1. FIG. 14 illustrates a state in which the first binder 20 is located at the separation location 20-2 in one example of the post-processing apparatus illustrated in FIG. 13. FIG. 15 illustrates a state in which the first binder 20 is located at the evacuation location 20-3 in one example of the post-processing apparatus illustrated in FIG. 13.

The post-processing apparatus according to the present example is different from the examples of the post-processing apparatus illustrated in FIGS. 10 to 12 in that the post-processing apparatus according to the present example has a structure in which the first binder 20 is rotated around the hinge 234 located inside the paper stack PS to be displaced to the separation location 20-2. Accordingly, differences from the examples of the post-processing apparatus illustrated in FIGS. 10 to 12 will be mainly described, the same configuration elements as the configuration elements previously described above are denoted by the same reference numerals, and redundant descriptions thereof will be omitted.

Referring to FIG. 13, the rotation base 230 provided with the first binder 20 may be supported by the first movement base 210 to be rotatable around the hinge 234. The hinge 234 is the center of rotation of the first binder 20 and is located inside the paper stack PS. As one example, the hinge 234 may be located near the pressure binding unit 21. The elastic member 240 applies an elastic force in a direction to be located at the binding location 20-1 to the first binder 20. In the binding location 20-1, the rotation base 230 may come into contact with the stopper 235 provided in the first movement base 210, and the first binder 20 may be maintained at the binding location 20-1 by the elastic force of the elastic member 240. The rotation base 230 is provided with an interference protrusion 237 protruding in the width direction W, that is, toward the second binder 30. The interference protrusion 237 interferes with the second movement base 310 when the second binder 30 is moved to the interference location 30-2. Accordingly, as illustrated in FIG. 14, the first binder 20 may be rotated to the separation location 20-2. The rotation base 230 is provided with a stopper 236 that comes into contact with the second movement base 310 when the first binder 20 reaches the separation location 20-2. The stopper 236 is located closer to the hinge 234 than the interference protrusion 237. The stopper 236 causes the first binder 20 to no longer rotate beyond the separation location 20-2.

When the second binder 30 is moved in the width direction W beyond the interference location 30-2, the first movement base 210 is moved in the width direction W, and the first binder 20 may be moved to the evacuation location 20-3 as illustrated in FIG. 15. When the second binder 30 is moved from the location 30-3 to the evacuation location 30-1 beyond the interference location 30-2, the first binder 20 is moved in the same direction as the second binder 30 by the elastic force of the second elastic member 250, and when the second binder 30 is moved to the evacuation location 30-1 beyond the interference location 30-2, the first binder 20 is rotated from the separation location 20-2 to the binding location 20-1 by the elastic force of the elastic member 240.

After the stapleless binding is performed, the controller 100 moves the second binder 30 in the width direction W to rotate the first binder 20 to the hinge 234 located inside the paper stack PS to be displaced to the separation location 20-2. For example, the controller 100 drives the motor M3 to move the second binder 30 to the interference location 30-2. When the second binder 30 approaches the interference location 30-2, the second movement base 310 comes into contact with the interference protrusion 237, and the rotation base 230 is rotated around the hinge 234. When the second binder 30 reaches the interference location 30-2, the first binder 20 reaches the separation location 20-2, as illustrated in FIG. 14. At this time, the pressure binding unit 21 may be separated from the paper stack PS while being twisted with respect to the paper stack PS. Since the first binder 20 is twisted in a state in which both ends in the width direction W are guided by the first side guide 42-1 and the second side guide 42-2 of the paper stack PS, a possibility that skew occurs in the paper stack PS may be reduced compared to the method of twisting the paper stack PS.

By moving the paper stack PS relative to the pressure binding unit 21 as described above while the first binder 20 is rotated from the binding location 20-1 to the separation location 20-2 by using the second binder 30, the paper stack PS may be more easily separated from the pressure binding unit 21. For example, the controller 100 may move the paper stack PS in the width direction W. For example, as described with reference to FIG. 4, the controller 100 may drive the motors M1 and M2 to simultaneously move the first side guide 42-1 and the second side guide 42-2 in the width direction W to be separated from the first binder 20. In addition, before the first binder 20 is rotated to the separation location 20-2, the controller 100 may drive the motor M2 to move the second side guide 42-2 outwards in the width direction W and drive the motor M1 to move the first side guide 42-1 inwards in the width direction while rotating the first binder 20 from the binding location 20-1 to the separation location 20-2, as illustrated in FIG. 5. As one example, the controller 100 may move the paper stack PS in the discharge direction as illustrated as a reference numeral PS-1 in FIG. 14. The controller 100 may move the paper stack PS in the discharge direction by switching the first roller 13 to a transport location and driving in a forward direction. As another example, the controller 100 may drive a motor (not illustrated) to drive the end guide 43 to move the end guide 43 in the discharge direction. According to this, since the paper stack PS is moved in a direction substantially opposite to a rotation direction of the pressure binding unit 21, the paper stack PS may be separated more easily from the pressure binding unit 21.

The examples described above are merely exemplary, and various modifications and equivalent other examples are possible to those skilled in the art. Thus, the true technical protection scope of the present disclosure will have to be defined by the technical idea of the disclosure described in the claims below.

What is claimed is:

1. A post-processing apparatus comprising:
 a paper alignment tray including a loading table on which a paper stack is to be loaded, and a side guide and an end guide to align a side in a width direction and an end in a longitudinal direction of the paper stack, respectively, when the paper stack is loaded on the loading table;
 a first binder including a binding unit to bind the paper stack on the paper alignment tray in a stapleless manner, the first binder displaceable to a binding location to bind the paper stack and to a separation location to separate the binding unit from the paper stack; and
 a controller to move a bound paper stack in a direction away from to the binding unit while simultaneously displacing the first binder from the binding location to the separation location, to cause the binding unit to separate from the bound paper stack.

2. The post-processing apparatus of claim 1, wherein the side guide including a first side guide close to the first binder and a second side guide distant from the first binder, and
 wherein the controller to move the second side guide outwards in the width direction before displacing the first binder to the separation location and to move the first side guide inwards in the width direction while displacing the first binder from the binding location to the separation location.

3. The post-processing apparatus of claim 1, wherein the side guide including a first side guide close to the first binder and a second side guide distant from the first binder, and
 wherein the controller to move the first side guide inwards in the width direction and to move the second side guide outwards in the width direction while displacing the first binder from the binding location to the separation location.

4. The post-processing apparatus of claim 1, wherein the controller to slide the first binder from the binding location to an outside of the paper stack in the width direction to be displaced to the separation location, and
 wherein the controller to move the side guide such that the paper stack is moved in a direction opposite to a sliding direction of the first binder.

5. The post-processing apparatus of claim 1, wherein the controller to rotate the first binder to be displaced from the binding location to the separation location.

6. The post-processing apparatus of claim 5, wherein the controller to rotate the first binder around a hinge on an outside of the paper stack to be displaced to the separation location.

7. The post-processing apparatus of claim 6, wherein the binding unit is outside the paper stack at the separation location.

8. The post-processing apparatus of claim 5, wherein the controller to rotate the first binder around a hinge inside the paper stack to be displaced to the separation location.

9. The post-processing apparatus of claim 5, further comprising:
 a second binder to be movable in the width direction and to drive a staple into the paper stack; and
 an elastic member to apply an elastic force to the first binder in a direction at the binding location,
 wherein the controller to move the second binder in the width direction to push the first binder in a direction opposite to the elastic force of the elastic member to rotate the first binder from the binding location to the separation location.

10. The post-processing apparatus of claim 1, wherein the direction the controller moves the bound paper stack is opposite to a direction in which the first binder is displaced.

11. The post-processing apparatus of claim 1, further comprising:
 a second binder to be movable in the width direction and to drive a staple into the paper stack,
 wherein the controller to further move the first binder from the separation location to an evacuation location so not to interfere with a binding operation of the second binder.

12. A post-processing apparatus comprising:
 a paper alignment tray including a loading table on which a paper stack is to be loaded, and a side guide and an end guide to align a side in a width direction and an end in a longitudinal direction of the paper stack, respectively;
 a first binder including a binding unit to bind the paper stack on the paper alignment tray in a stapleless manner, the first binder rotatable to a binding location to bind the paper stack and to a separation location to separate the binding unit from the paper stack;
 a controller to move a bound paper stack in a direction away from the binding unit while simultaneously rotating the first binder from the binding location to the separation location, to cause the binding unit to separate from the bound paper stack; and
 an elastic member to apply an elastic force to the first binder in a direction at the binding location.

13. The post-processing apparatus of claim 12, further comprising a second binder to drive a staple into the paper stack,
 wherein the second binder is movable to an interference location in the width direction to rotate the first binder from the binding location to the separation location by pushing the first binder.

14. The post-processing apparatus of claim 13, wherein a hinge in a center of rotation of the first binder is outside the paper stack loaded on the loading table.

15. The post-processing apparatus of claim 13, wherein a hinge in a center of rotation of the first binder is inside the paper stack loaded on the loading table.

16. The post-processing apparatus of claim 13, further comprising a stopper to prevent the first binder from being rotated beyond the separation location.

17. The post-processing apparatus of claim 16, wherein the first binder is to be pushed by the second binder moved beyond the interference location to be slid to an evacuation location separated from the paper stack in the width direction.

18. The post-processing apparatus of claim 12, wherein the controller moves the bound paper stack in the longitudinal direction away from the binding unit by driving a roller coupled to the bound paper stack at a nip.

19. The post-processing apparatus of claim 12, wherein the controller moves the bound paper stack in the longitudinal direction away from the binding unit by moving the end guide in a paper stack discharge direction.

20. The post-processing apparatus of claim 12, wherein the elastic member applies the elastic force to the first binder in the direction at the binding location which causes the binding unit to rotate toward the binding location.

\* \* \* \* \*